Sept. 30, 1952  R. F. TAYLOR  2,612,073
HOLLOW THREADED RIVETS
Filed Dec. 6, 1946

Inventor
R. F. Taylor

Patented Sept. 30, 1952

2,612,073

UNITED STATES PATENT OFFICE 2,612,073

HOLLOW THREADED RIVET

Roland Foster Taylor, Manchester, England, assignor to A. T. S. Company Limited, London, England, a British company Application December 6, 1946, Serial No. 714,443
In Great Britain April 19, 1944

Section 1, Public Law 690, August 8, 1946
Patent expires April 19, 1964

1 Claim. (Cl. 85—40)

This invention relates to hollow rivets as used for blind riveting, in which the rivet is closed at the blind side by pulling a headed pin into the hollow rivet until the pin fractures adjacent to the head.

The object of the present invention is to provide means whereby a hollow rivet of the kind referred to can be used for securing parts in position upon the riveted plates, sheets or the like.

In accordance with my invention, the hollow rivet is tapped for any desired distance inwards from its flanged end. When the headed pin, which closes the blind end of the rivet and effects the riveting operation, has fractured, the tapped portion of the rivet can have a fastening screw threaded therein. As the riveting operation may deform some of the threads in the rivet, these exert a locking action upon the screw when it is threaded therein. The threaded portion of the rivet is sufficiently long so that at least some of the threads are deformed as a result of the riveting operation. The riveting operation causes the rivet to have such a firm hold upon the metal parts being riveted, that it is not disturbed when the screw is threaded firmly therein.

The screw may be employed as an additional sealing and strengthening means for the rivet, in addition to its function as a means of attachment for any part which it is desired to secure to the riveted members.

The tapped hollow rivet may serve as a self-locking anchor device or nut, to which parts can be secured by the screw which threads into the rivet.

Figure 1:
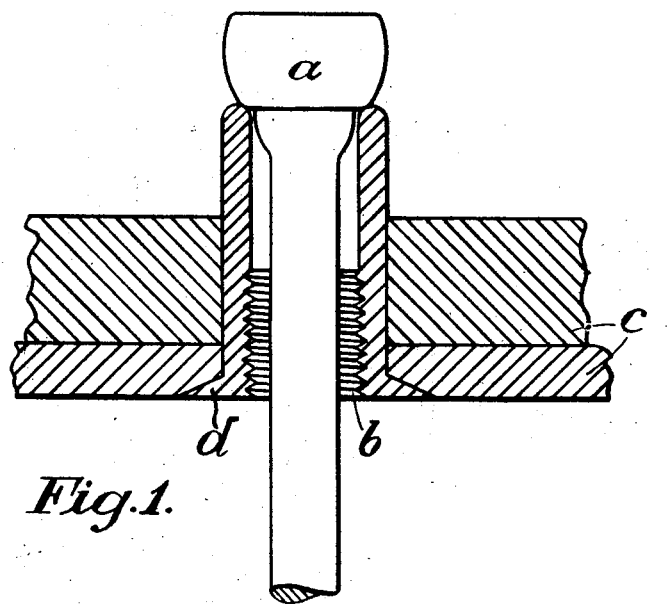
Figure 2:
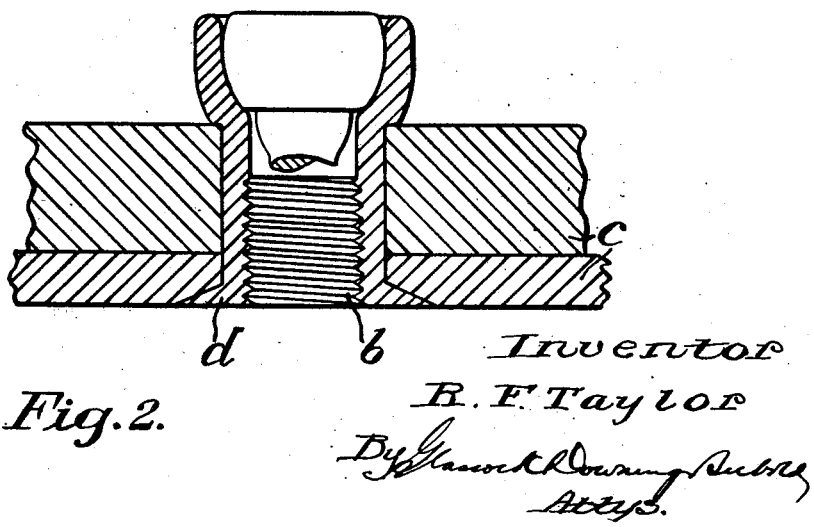

The accompanying explanatory drawings show in Figure 1 a sectional elevation of the improved rivet prior to use and in Figure 2 a sectional elevation of the rivet after it has secured two parts together and is ready to have a screwed part threaded therein. It will be seen that the tubular rivet which is flanged at $d$ and internally screw threaded at $b$ has, as shown in Figure 2, been deformed by the headed pin $a$ which has been pulled and fractured therein. It will be understood that the pin $a$ is formed in a well-known manner so that it fractures at a point within the bore of the rivet adjacent the inner end of the threaded portion thereof, as shown in the drawing. The tapped portion $b$ of the rivet can now be used for securing a screwed member therein. Such screw can secure a part or parts to the plates or sheets $c$ which have been riveted together.

What I claim is:

A combined rivet and threaded socket for a fastening screw comprising a tubular rivet having at one end an external flange and an internal screw thread which extends from the flange into the bore of the rivet for a substantial portion of the length of the rivet, and a pin extending through the tubular rivet from its externally flanged end and projecting beyond the other end of the rivet where it has an enlarged head of a maximum diameter not greater than the external diameter of the shank of the rivet, said rivet and pin being of the type wherein drawing tension applied to the end of the pin beyond the flanged end of the rivet causes the head of the pin to expand the other end of the rivet until the drawing tension fractures the pin and leaves the head of the pin in the expanded part of the rivet, said pin embodying means to ensure fracture of the pin within the bore of the rivet at a point adjacent the inner end of said screw-threaded portion, whereby the screw-threaded portion of the rivet remains open and forms a threaded socket for receiving a fastening screw, the length of said threaded portion being such that at least a portion of the threads thereof will be deformed by the drawing tension of said pin.

ROLAND FOSTER TAYLOR.

REFERENCES CITED

The following references are of record in the file of this patent:

UNITED STATES PATENTS

| Number | Name | Date |
|---|---|---|
| 1,150,114 | Hays | Aug. 17, 1915 |
| 1,643,771 | Iseman | Sept. 27, 1927 |
| 1,979,686 | Hall | Nov. 6, 1934 |
| 2,148,977 | Buck | Feb. 28, 1939 |
| 2,181,103 | Davis | Nov. 21, 1939 |
| 2,195,029 | Hathorn | Mar. 26, 1940 |
| 2,365,834 | Olmsted | Dec. 26, 1944 |
| 2,272,222 | Mullgardt | Mar. 27, 1945 |
| 2,384,321 | Lees | Sept. 4, 1945 |

FOREIGN PATENTS

| Number | Country | Date |
|---|---|---|
| 106,169 | Great Britain | May 17, 1917 |
| 504,928 | Great Britain | 1938 |